Patented Nov. 11, 1947

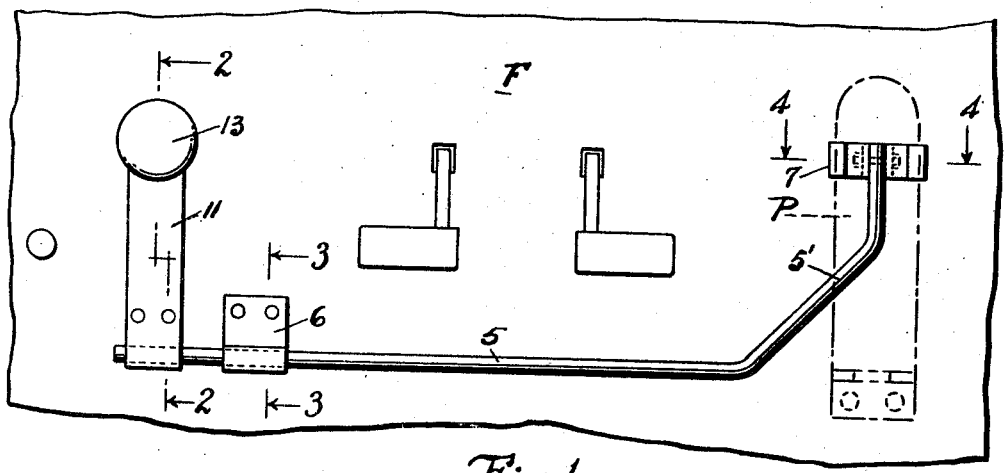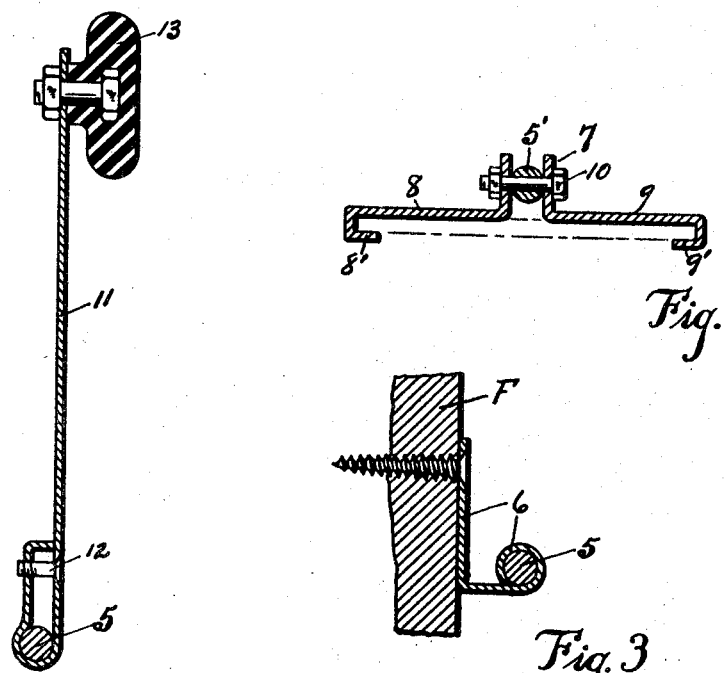

2,430,561

UNITED STATES PATENT OFFICE 2,430,561

LEFT FOOT ACCELERATOR PEDAL FOR AUTOMOBILES

Joseph H. Fletcher, South Gate, Calif.

Application May 6, 1946, Serial No. 667,570

1 Claim. (Cl. 74—480)

My invention relates to a left foot accelerator pedal for automobiles, and more particularly to a simple, practical and economical pedal assembly which can be quickly applied to the floor board of a motor vehicle, and connected with the regular accelerator pedal in such a way that it can be actuated by the left foot of the driver, when he gets tired of the usual acceleration with his right foot.

It is well known that in long drives, one's right leg and foot gets tired and a change to the left foot operation would be a real relief, if this were possible.

It is the object of my invention to provide just such a left foot accelerator pedal which is in addition to the regular right foot accelerator, without interference with its use in the usual way.

I have illustrated one practical embodiment of my invention on the accompanying sheet of drawings, which I will now describe.

Figure 1 is a plan view of a motor vehicle floor board, showing my invention in place thereon;

Figure 2 is a sectional view taken on the line 2—2 of Fig. 1;

Figure 3 is a sectional view taken on line 3—3 of Fig. 1; and

Figure 4 is a transverse sectional view taken on line 4—4 of Fig. 1.

On the drawings, F designates the floor board of a motor vehicle, with the usual right foot accelerator pedal P indicated in light broken lines.

My invention, as here illustrated, includes a rocker bar 5, rotatably anchored to the floor by means of a bearing member 6, said bar being extended to the right and upwardly at an angle, as at 5′, and provided with clamping means, 7, with which it is secured to the underside, top portion of the pedal P. Said clamping means is shown in section in Fig. 4, and consists of two clamp members, 8 and 9, having hooks at their outer ends, designated 8′ and 9′, and at their adjacent ends bent to angles and bolted to the bar 5, as at 10.

On the left end of said rocker bar 5, I have mounted a left foot accelerator pedal 11, adjustably secured in place on said bar by means of a spring loop portion, formed on the end of the pedal body, with screw 12, as shown. At the upper end of said pedal, I have shown a rubber head or foot piece 13. This pedal can be of any desired form and placed in the most convenient place for the convenience of the driver, as may be desired.

Thus a very simple and practical left foot accelerator device, or attachment, is provided which can be readily put in place on the foot board of any motor vehicle and will not in any way interfere with the regular means of driving, but it does provide means for relieving the right leg and foot when tired.

I do not limit the invention to the showing made, except as I may be limited by the hereto appended claim, forming a part of this specification.

I claim:

In combination with the foot board of a motor vehicle, and the regular accelerator pedal for driving said vehicle, an auxiliary accelerator pedal mechanism including a rocker bar rotatably anchored along the lower portion of the floor and having one end bent upwardly to form an angle portion extended to and provided with clamp members to be detachably connected with the upper part of the regular accelerator pedal, and having at its other end, a pedal adjustably attached thereto and operable by being depressed for simultaneously depressing the regular accelerator pedal.

JOSEPH H. FLETCHER.

REFERENCES CITED

The following references are of record in the file of this patent:

UNITED STATES PATENTS

| Number | Name | Date |
|---|---|---|
| 2,071,013 | Ajdukovich | Feb. 16, 1937 |
| 2,187,068 | Adamic | Jan. 16, 1940 |
| 2,202,126 | Tercero | May 28, 1940 |